US006864610B2

(12) United States Patent
Hase et al.

(10) Patent No.: US 6,864,610 B2
(45) Date of Patent: Mar. 8, 2005

(54) ROTOR, MANUFACTURING METHOD OF THE ROTOR AND MOTOR USING THE ROTOR

(75) Inventors: Atsushi Hase, Okazaki (JP); Akira Hiramitsu, Okazaki (JP); Yasuo Kinoshita, Aichi-ken (JP); Yasuharu Terada, Toyota (JP); Yuji Sekitomi, Anjo (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/634,785

(22) Filed: Aug. 6, 2003

(65) Prior Publication Data

US 2004/0095032 A1 May 20, 2004

(30) Foreign Application Priority Data

Aug. 7, 2002 (JP) ........................................ 2002-230530

(51) Int. Cl.[7] .............................................. H02K 21/12
(52) U.S. Cl. ..................................... 310/156.11; 310/43
(58) Field of Search ........................ 310/156.11–156.15, 310/156.28–156.31, 43

(56) References Cited

FOREIGN PATENT DOCUMENTS

| JP | 62-24826 | 2/1987 | |
|---|---|---|---|
| JP | 06078481 A | * 3/1994 | ............ H02K/1/27 |
| JP | 6-284650 | 10/1994 | |
| JP | 7-19234 | 1/1995 | |
| JP | 2002-78258 | 3/2002 | |

* cited by examiner

*Primary Examiner*—Thanh Lam
(74) *Attorney, Agent, or Firm*—Oblon, Spivak, McClelland, Maier & Neustadt, P.C.

(57) ABSTRACT

In a rotor having plural permanent magnets secured on a rotary shaft for use in, e.g., an electric motor which is incorporated preferably into a rack-type electric power steering device, a cylindrical cover is fit on the rotary shaft to cover the external surfaces of the plural permanent magnets, and one or both axial end portions of the cylindrical cover are plastically deformed thereby to secure the cylindrical cover onto the rotary shaft. Thus, the cylindrical cover is firmly secured to the rotary shaft and, even when one or more permanent magnets are separated from the rotary shaft or broken, prevents the separated permanent magnets or the broken fragments from scattering within a housing of the motor.

7 Claims, 3 Drawing Sheets

ROTOR, MANUFACTURING METHOD OF THE ROTOR AND MOTOR USING THE ROTOR

INCORPORATION BY REFERENCE

This application is based on and claims priority under 35 U.S.C. sctn. 119 with respect to Japanese Application No. 2002-230530 filed on Aug. 7, 2002, the entire content of which is incorporated herein by reference.

BACKGROUND OF THE INVENTION

1. Field of the Invention

The present invention relates to a rotor with a plurality of permanent magnets secured on a rotary shaft. It also relates to a method of manufacturing the rotor and to a motor using the same.

2. Discussion of the Related Art

Heretofore, there has been a known an electric motor as described in Japanese unexamined, published patent application No. 6-284650 (1994-284650). In the motor, a plurality of permanent magnets are circumferentially arranged and secured by gluing to the external surface of a rotary shaft, and a cylindrical cover whose internal surface is slightly larger than a diameter defined by the external surfaces of the permanent magnets is fit on the external surfaces of the permanent magnets in order that the permanent magnets can be prevented from scattering when separated from the rotary shaft or broken. In the manufacturing of the motor, a freely rotatable roll is brought into alignment with an axial flute or groove which extends at a juncture portion of every two adjoining permanent magnets and is axially moved along the axial groove while being pressed on the external surface of the cylindrical cover, whereby the same is plastically deformed to be bent into the axial groove, thereby having the internal surface fit tightly on the external surface of the permanent magnets.

The permanent magnets are fragile, and therefore, when the roll is moved along the axial groove formed at the juncture portion of every two adjoining permanent magnets as it is pressured into the axial groove, it often occurs that the permanent magnets are broken or damaged due to a large force acting thereon.

It has also bee practiced to adhere and secure the cylindrical cover to the rotary shaft with an adhesive. Adhesives are generally liable to suffer the environmental influences such as, for example, temperature, humidity, or the like and are difficult to be kept constant in quality. This gives raise to a drawback that where such an adhesive is used, the time to manufacture the motor is extended and the manufacturing cost is increased. Moreover, as the performance of the adhesive is deteriorated due to the thermal influence, the cylindrical cover gets out of place, whereby it cannot perform the function to prevent separated permanent magnets or broken fragments thereof from scattering.

SUMMARY OF THE INVENTION

Accordingly, it is a primary object of the present invention to provide an improved rotor wherein a cylindrical cover of a non-magnetic material covering the external surfaces of a plurality of permanent magnets can be fixed on a rotary shaft reliably and at a low cost.

Another object of the present invention is to provide an improved method of manufacturing a rotor which method is capable of firmly fixing a cylindrical cover on a rotary shaft without damaging plural permanent magnets secured to the external surface of the rotary shaft.

A further object of the present invention is to provide an improved motor incorporating the rotor as set forth above.

Briefly, according to the present invention, there is provided a rotor having a plurality of permanent magnets secured circumferentially on the external surface of a rotary shaft. The rotor includes a cylindrical cover made of a non-magnetic material covering the external surfaces of the plurality of permanent magnets, wherein the cylindrical cover is fixed to the rotary shaft with at least one of axial end portions thereof being plastically deformed.

With this configuration, the cylindrical cover is fit on the rotary shaft to cover the plural permanent magnets secured to the external surface of the rotary shaft and is secured to the rotary shaft with at least one axial end portion thereof being plastically deformed. Thus, the cylindrical cover can be reliably secured on the rotary shaft and when one or more permanent magnets are separated from the rotary shaft or broken, can prevent the separated magnets or fragments of the broken magnets from scattering out thereof, namely within, e.g., a housing incorporating the rotor. Further, since the cylindrical cover is secured to the rotary shaft through the plastic deformation of one or both end portions thereof, it can be obviated to damage the fragile permanent magnets, and it can be realized to reduce the time and cost to manufacture the rotor.

In another aspect of the present invention, there is provide a method of manufacturing a rotor which secures plural permanent magnets onto an annular small diameter portion thereof and which is formed with large diameter portions located in the vicinity of the axial ends of the annular small diameter portion, the large diameter portions being slightly larger in diameter than that defined by the external surfaces of the plural permanent magnets. The method includes a step of providing a roll rotatable freely, a step of bringing the roll to face the external surface of said cylindrical cover in alignment with an annular groove formed on at least one of the large diameter portions, and a step of pressing the roll onto the external surface of a cylindrical cover fit on the rotary shaft to cover the permanent magnets while revolving the roll around the rotary shaft so that one axial end of the cylindrical cover is plastically deformed into the annular groove over the whole circumferential length of the annular groove.

In this method, at least one end portion of the cylindrical cover is plastically deformed with a roll to be engaged into the annular groove formed on one of the large diameter portions of the rotary shaft, so that the cylindrical cover can be reliably secured to the large diameter portion of the rotary shaft in a stable quality, in a short work time and at a low cost.

In a further aspect of the present invention, there is provided a motor wherein a rotor is mounted in a housing to be rotatable within a stator secured to an internal surface of said housing. As defined in the invention directed to the rotor, the rotor incorporated into the motor has a plurality of permanent magnets secured circumferentially on the external surface of a rotary shaft and includes a cylindrical cover made of a non-magnetic material covering the external surfaces of the plurality of permanent magnets. The cylindrical cover is fixed to the rotary shaft with at least one axial end portion being plastically deformed.

With this configuration, the rotor of the motor is so constituted that the permanent magnets secured on the rotary shaft are covered with the cylindrical cover which is plastically deformed at at least one end portion thereof to be secured to the rotary shaft. Thus, the cylindrical cover can be secured to the rotary shaft reliably, and even when separated from the rotary shaft or broken, the permanent magnets or the fragments thereof can be reliably prevented from scattering within the housing.

BRIEF DESCRIPTION OF THE ACCOMPANYING DRAWINGS

The foregoing and other objects and many of the attendant advantages of the present invention may readily be appreciated as the same becomes better understood by reference to a preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT

An embodiment of a rotor and an embodiment of a motor using the rotor according to the present invention will be described hereinafter.

Figure 1:
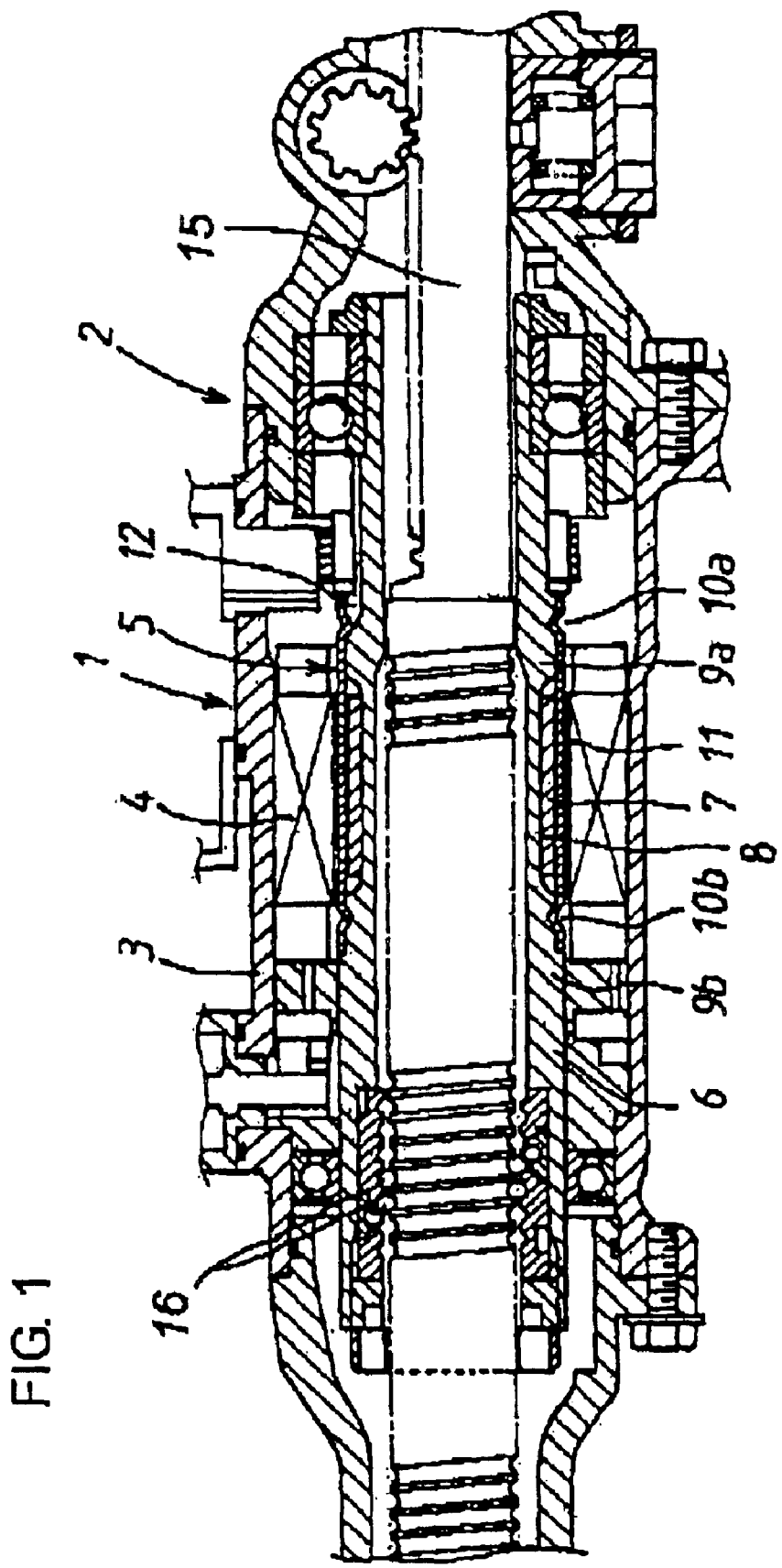
FIG. 1 is a longitudinal sectional view of a motor for a rack-type electric power steering device incorporating a rotor according to the present invention.

Referring now to the drawings and more particular to FIG. 1 thereof, there is shown an electric motor 1, which is incorporated into a rack-type electric power steering device 2 for vehicles. A housing 3 of the motor 1 has fixedly inserted therein a stator 4, within which a rotor 5 is rotatably supported by means of bearings. The stator 4 is composed of plural cores and coils wound around teeth of each core. The cores are circumferentially arranged and received in a method of shrinkage fit within a bore of the housing 3, and each of the cores is made up by laminating a plurality of thin stamped-out magnetic plates made of, e.g., Si—Fe alloy or a suitable electromagnetic steel plate.

The rotor 5 takes the construction that a plurality of permanent magnets 7 are secured circumferentially at regular intervals on the external surface of a rotary shaft 6 which is rotatably supported in the housing 3 by means of bearings. The rotary shaft 6 is formed with an annular small diameter portion 8, to which the permanent magnets 7 are secured with a suitable adhesive. In a modified form of the embodiment, one or more holding plates secured to the rotary shaft 6 may be used to press the permanent magnets 7 on the rotary shaft 6 thereby to mechanically fix the permanent magnets 7 thereon. The rotary shaft 6 is also formed with large diameter portions 9a, 9b respectively at axial both sides of the annular small diameter portion 8. To be more exact, the large diameter portions 9a, 9b are respectively adjacent to, or in the vicinity of, the both axial ends of the annular small diameter portion 8. The diameter of the large diameter portions 9a, 9b is chosen to be slightly larger than the diameter defined by the external surfaces of the permanent magnets 7. Annular grooves 10a, 10b are formed respectively on the external surfaces of the large diameter portions 9a, 9b.

A numeral 11 denotes a cylindrical cover made of a non-magnetic material covering the external surfaces of the plural permanent magnets 7. The cylindrical cover 11 is shaped by rounding like a pipe a thin plate made of a non-magnetic metal such as, for example, stainless steel and so on and then by welding the mating end portions. The axial both end portions of the cylindrical cover 11 are snugly fit respectively on the large diameter portions 9a, 9b located at the axial both sides of the annular small diameter portion 8. The axial both end portions of the cylindrical cover 11 are plastically deformed by being caulked with a roll to be engaged into the annular grooves 10a, 10b over the whole circumferential length of each grooves 10a, 10b, so that they are secured respectively to the large diameter portions 9a, 9b. Further, one end of the cylindrical cover 11 is caulked by a suitable punching tool to be bent into an axial groove 12 which is formed on the rotary shaft 6 to extend axially from one end to the large diameter portion 9a, and hence, is firmly secured not to rotate relative to the rotary shaft 6.

The operation of the embodiment as constructed hereinabove will be described hereinafter. When an electric current is flown through the stator 4 in a direction depending on the operating direction of the rack-type electric power steering device 2, a magnetic force is generated from the coil, and the cooperation of the coil magnetic force with the magnetic force of the permanent magnets 7 produces a rotational force on the rotor 5 thereby to rotationally drive the same. In the event that one or more permanent magnets 7 or fragments thereof are separated from the rotary shaft 6 during the rotation of the rotor 5, the separated permanent magnets 7 or the fragments thereof remains within a space which is defined by the annular small diameter portion 8, the large diameter portions 9a, 9b at the axial both sides of the same and the cylindrical cover 11 fit at the both axial end portions thereof on the large diameter portions 9a, 9b. Accordingly, it can be reliably prevented that the separated permanent magnets 7 or the fragments thereof scatter within the housing 3 thereby to bring the motor 1 or the like into a lock state or a standstill. Furthermore, in this particular embodiment, since the cylindrical cover 11 is plastically deformed at its axial both end portions to be bent and engaged into the annular grooves 10a, 10b of the large diameter portions 9a, 9b over the whole circumferential length of each of the grooves 10, 10b, the scattering of the permanent magnets or the fragments thereof can be obviated with the highest reliability.

Although in the foregoing embodiment, the both axial end portions of the cylindrical cover 11 are engaged by plastic deformation respectively into the annular grooves 10a, 10b of the large diameter portions 9a, 9b over the whole circumferential length of each of the grooves 10a, 10b, there may be made a modification wherein only one of the axial end portions of the cylindrical cover 11 is engaged into the corresponding annular groove 10a or 10b over the whole circumferential length thereof. Another modification is also possible, wherein one or more shallow holes are made on at least one of the large diameter portions 9a, 9b to extend radially inwardly from the external surface thereof and wherein the cylindrical cover 11 is secured to the corresponding one of the large diameter portions 9a, 9b by being punched thereby to be plastically deformed and caulked into the hole.

Furthermore, still another modification may be made as follows: That is, instead of providing the rotary shaft 6 with the large diameter portions 9a, 9b, two annular members each like a ring whose outer diameter is slightly larger than the diameter defined by the external surfaces of the permanent magnets 7 may be fit on the rotary shaft 6 in the vicinity of the both axial ends of the permanent magnets 7, the cylindrical cover 11 covering the external surfaces of the plural permanent magnets 7 may be fit at the axial end portions thereof on the annular members, and the axial end portions of the cylindrical cover 11 may be plastically deformed on the rotary shaft while covering up the annular members. In this modified form of the embodiment, only one annular member may be used, and the cylindrical cover 11 may be plastically deformed on the rotary shaft while covering up the annular member. In addition, a further modification may be made, wherein the cylindrical cover 11 is secured to the rotary shaft 6 with one axial end portion thereof being plastically deformed on the large diameter portion 9a or 9b of the rotary shaft 6 and with the other axial end portion thereof being plastically deformed on the annular member.

Figure 2:
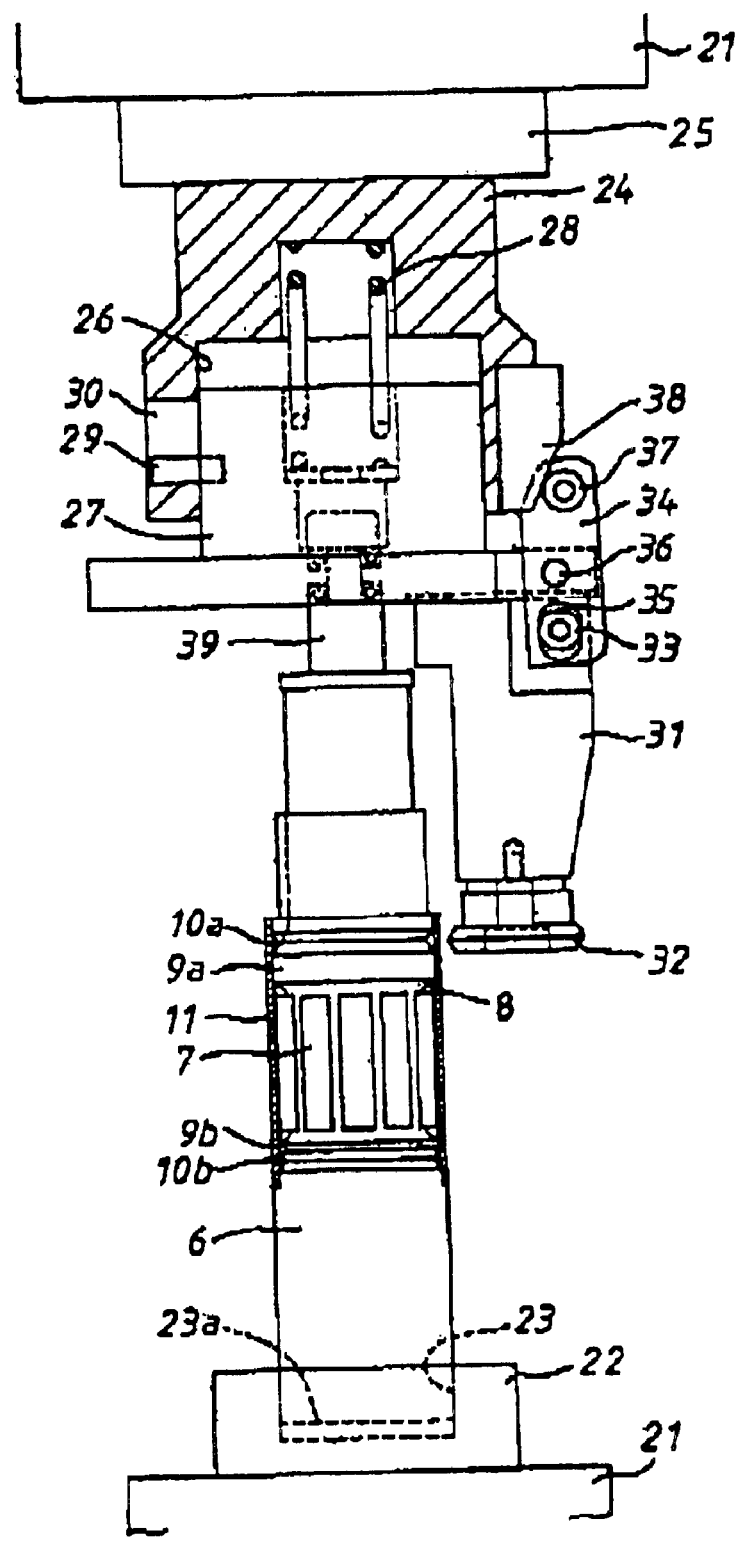
FIG. 2 is a front view showing an important part of a roll caulking machine.

An embodiment of a method of manufacturing the rotor 5 will be described hereafter. Referring now to FIG. 2, there is illustrated an important part of a roll caulking machine for plastically deforming the end portion of the cylindrical cover 11 with a roll thereby to engage the deformed portion of the cylindrical cover 11 into the annular groove 10a formed on the large diameter portion 9a of the rotary shaft 6 over the whole circumferential length of the annular groove 10a. The roll caulking machine includes a base frame 21, illustrated being separated at upper and lower parts of the drawing. The lower part of the base frame 21 mounts a hold head 22 thereon. The rotary shaft 6 is inserted at one end thereof into a hold hole 23 of the hold head 22 with the axis thereof extending vertically and is restricted from rotation with a keyway (not numbered) formed at one end surface of the rotary shaft 6 being engaged with a key 23 protruding from a bottom wall of the hold hole 23.

The upper part of the base frame 21 mounts a rotary head 25 to be rotatably and axially movable. The rotary head 25 is drivable by a motor or the like (not shown) to be rotated about a vertical axis at a slow speed and is movable by a cylinder device or the like (not shown) toward and away from the hold head 22. A rolling head 24 is mounted bodily on the lower surface of the rotary head 25 in axial alignment therewith. The rolling head 24 is formed with a bottomed insertion bore 26 which opens from the lower end surface of the rolling head 24 in axial alignment with the same. A movable member 27 is inserted into the insertion bore 26 movably relative to the rolling head 24. A compression spring 28 is interposed between the movable member 27 and a bottom surface of the insertion bore 26 and urges the movable member 27 toward the lowermost position as shown in FIG. 2. A pin 29 is protruded horizontally from the external surface of the movable member 27. When the pin 29 is brought into engagement with a lower end surface of an elongated hole 30 which is vertically formed on a circumferential wall defining the insertion hole 26, the movable member 27 is restrained from further downward movement relative to the rolling head 24.

Several or, preferably, three arms 31 each guided to be horizontally movable radially of the axis of the rotary head 25 are mounted at the lower surface of the movable member 27 at equiangular distances. The lower end of each arm 31 carries a roll 32 freely rotatably about a vertical axis, and the roll 32 takes the shape in cross-section complementary to the cross-section of the annular groove 10a formed on the large diameter portion 9a of the rotary shaft 6. The upper outer end portion of each arm 31 carries a roller 33 rotatably about a horizontal axis, and each roller 33 is received in a vertically elongated hole 35 horizontally formed at the lower end portion of a link 34. Each link 34 is carried at a middle portion thereof on the lower end portion of the movable member 27 and is pivotable about a horizontal pivot pin 36. A cam follower 37 is supported on the upper end portion of each link 34 rotatably about a horizontal axis and is held in contact engagement with a cam 38 secured to the external surface of the rolling head 24. An abutting member 39 is supported on the lower surface of the movable member 27 in the axial alignment with same and is freely rotatable about the vertical axis.

Next, description will be made as to a method of manufacturing the rotor 5 by rolling and caulking the axial end portions of the cylindrical cover 11 into the annular grooves 10a, 10b of the rotary shaft 6. To begin with, the plural permanent magnets 7 are adhered with a suitable adhesive to the annular small diameter portion 8 formed on the rotary shaft 6. At this stage, the large diameter portions 9a, 9b whose diameter is slightly larger than the diameter defined by the external surfaces of the plural permanent magnets 7 having being adhered to the annular small diameter portion 8 have been formed in the vicinity of the both axial ends of the annular small diameter portion 8, and the annular grooves 10a, 10b have been formed respectively on the large diameter portions 9a, 9b.

At the next step, the cylindrical cover 11 made of a stainless steel is put on the rotary shaft 6 thereby to fit the both axial end portions thereof on the large diameter portions 9a, 9b and at the same time, to cover the external surfaces of the plural permanent magnets 7. Then, the rotary shaft 6 now with the cylindrical cover 11 fit thereon is vertically inserted into the hold hole 23 of the hold head 22 of the roll caulking machine with the large diameter portion 9b being put on the downside and is secured against rotation with the keyway (not numbered) thereof being engaged with the key 23a of the hold head 22. With the rotary shaft 6 oriented vertically like this, since the lower end surface of the cylindrical cover 11 is brought into abutment with a stepped portion which is formed on the large diameter portion 9b, the cylindrical cover 11 can be held, without getting out of place, in position to fit the both axial end portions thereof on the large diameter portions 9a, 9b and at the same time, to cover the plural permanent magnets 7 having been fixed to the small diameter portion 8.

Figure 3A:
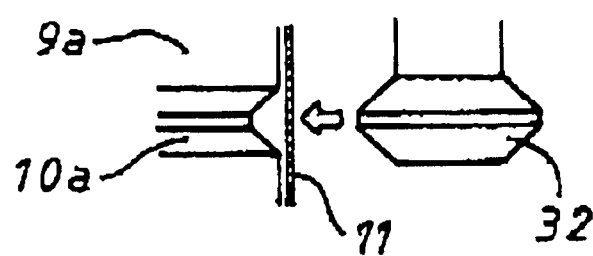
FIGS. 3(a) and 3(b) are explanatory views showing the process that one end of a cylindrical cover is caused with a roll.
Figure 3B:
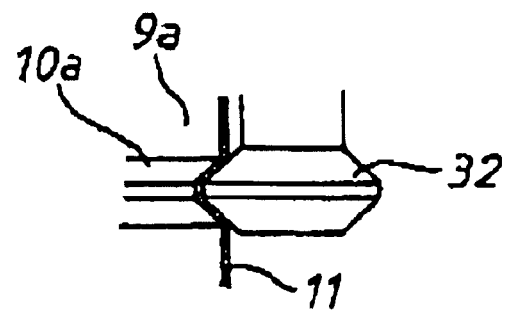

As the roll caulking machine is then brought into operation, the rotary head 25 is moved downward while being rotated at a slow speed, and the movable head 27, together with the rolling head 24, is moved downward while being rotated at the same slow speed. When the abutting member 39 comes into abutment with the upper end surface of the rotary shaft 6, the further downward movement of the movable head 27 is discontinued against the compression spring 28, after which the rolling head 24 only is moved downward relative to the movable head 27. This causes the cams 38 to move the cam followers 37 radially outwardly, and the three links 34 are so pivoted that the rollers 33 carried on the lower ends of the links 34 are displaced radially inwardly. Thus, the three arms 31 and hence, the rolls 32 are horizontally moved radially inwardly towards the cylindrical cover 11 through the engagement of each roller 33 with the corresponding elongated hole 35, as shown in FIG. 3(A). Each roll 32 rotatable freely is pressed onto the external surface of the cylindrical cover 11 at a position to face the annular groove 10a formed on the large diameter portion 9a while it is revolved around the rotary shaft 6 through the rotation of the movable head 27 about the vertical axis. As a result, the axial end portion of the cylindrical cover 11 is plastically deformed by being put between the three rolls 32 under pressure, as shown in FIG. 3(B) and is caulked to be bent and engaged into the annular groove 10a over the whole circumferential length of the same, whereby the cylindrical cover 11 is firmly secured onto the large diameter portion 9a of the rotary shaft 6.

Subsequently, the rotary shaft 6 onto which one end of the cylindrical cover 11 has been secured by the roll caulking process is pulled out of the hold hole 23 of the roll caulking machine and is turned upside down. Then, the rotary shaft 6 is carried into another or second roll caulking machine not shown for the other end portion of the cylindrical cover 11 and is vertically inserted into the hold hole 23 of the second roll caulking machine while being secured against rotation. The other end portion of the cylindrical cover 11 is rolled and caulked to be engaged into the annular groove 10b of the large diameter portion 9b in the same manner as described hereinbefore.

In the foregoing embodiment, the rotary shaft 6 is exemplified as a shaft sleeve whose inner surface is screw-engaged by means of plural steel balls 16 with the outer surface of a rack shaft 15 extending passing therethrough. However, the rotary shaft 6 may be a solid shaft not having a through hole.

The foregoing embodiment employs a separate or second roll caulking machine (not shown) in performing the roll caulking on the other end portion of the cylindrical cover 11. However, one roll caulking machine may be used to perform the roll caulking operations on both end portions of the cylindrical cover 11. This can be done by exchanging the hold head 22 with another having a different shape after completing the roll caulking on one end portion of the cylindrical cover 11.

In the embodiment described hereinabove, the cylindrical cover 11 is secured to the large diameter portions 9a, 9b in the vicinity of the both axial end portions of the annular small diameter portion 8 where the permanent magnets 7 are secured. Therefore, when the cylindrical cover 11 is plastically deformed to be secured to the large diameter portions 9a, 9b, it does not occur that any unfavorable force is applied to the permanent magnets 7, so that the same can be free from being damaged. Further, since the large diameter portions 9a, 9b have a slightly large diameter than that defined by the external surfaces of the permanent magnets 7, the cylindrical cover 11 does not damage the permanent magnets 7 when being fit on the rotary shaft 6. Furthermore, since the cylindrical cover 11 is secured to the rotary shaft 6 by being plastically deformed with a roll 32 over the whole circumferential length of each of the annular grooves 10a, 10b, it can be rigidly fixed onto the whole circumferential length of the rotary shaft 6. Accordingly, it can be more reliably prevented that the permanent magnets 7 separated from the rotary shaft 6 or the broken fragments thereof scatter out of the cylindrical cover 11.

Although both axial end portions of the cylindrical cover 11 are plastically deformed in the embodiment described above, a modification may be made in which only one of the axial end portions of the cylindrical cover 11 is plastically deformed to secure the same onto the rotary shaft 6.

Obviously, numerous modifications and variations of the present invention are possible in light of the above teachings. It is therefore to be understood that within the scope of the appended claims, the present invention may be practiced otherwise than as specifically described herein.

What is claimed is:

1. A rotor having a plurality of permanent magnets secured circumferentially on the external surface of a rotary shaft, said rotor includes a cylindrical cover made of a non-magnetic material covering the external surfaces of said plurality of permanent magnets, wherein said cylindrical cover is fixed to said rotary shaft with at least one of axial end portions thereof being plastically deformed at a circumferentially extending deformation.

2. A rotor having a plurality of permanent magnets secured circumferentially on the external surface of a rotary shaft, said rotor includes a cylindrical cover made of a non-magnetic material covering the external surfaces of said plurality of permanent magnets, wherein said cylindrical cover is fixed to said rotary shaft with at least one of axial end portions thereof being plastically deformed, wherein:

said plurality of permanent magnets are secured at an annular small diameter portion formed on said rotary shaft;

large diameter portions whose diameter is slightly larger than the diameter defined by the external surfaces of said plurality of permanent magnets held on said rotary shaft are formed respectively in the vicinity of the axial ends of said annular small diameter portion;

said cylindrical cover made of said non-magnetic material covering the external surfaces of said plurality of permanent magnets are secured to said rotary shaft with both axial end portions thereof being fit respectively on said large diameter portions formed in the vicinity of the axial ends of said small diameter portion; and at least one of said both axial end portions of said cylindrical cover is plastically deformed to be secured onto a corresponding one of said large diameter portions.

3. A rotor as set forth in claim 2, wherein:

an annular groove is formed on at least one of said large diameter portions provided in the vicinity of the axial ends of said small diameter portion; and said cylindrical cover is plastically deformed at one end portion thereof to be bent and engaged into said annular groove.

4. A method of manufacturing a rotor having a plurality of permanent magnets secured circumferentially on the external surface of a rotary shaft, said rotor includes a cylindrical cover made of a non-magnetic material covering the external surfaces of said plurality of permanent magnets, wherein said cylindrical cover is fixed to said rotary shaft with at least one of axial end portions thereof being plastically deformed, wherein said plurality of permanent magnets are secured at an annular small diameter portion formed on said rotary shaft; large diameter portions whose diameter is slightly larger than the diameter defined by the external surfaces of said plurality of permanent magnets held on said rotary shaft are formed respectively in the vicinity of the axial ends of said annular small diameter portion: said cylindrical cover made of said non-magnetic material covering the external surfaces of said plurality of permanent magnets are secured to said rotary shaft with both axial end portions thereof being fit respectively on said large diameter portions formed in the vicinity of the axial ends of said small diameter portion; and at least one of said both axial end portions of said cylindrical cover is plastically deformed to be secured onto a corresponding one of said large diameter portions, wherein an annular groove is formed on at least one of said large diameter portions provided in the vicinity of the axial ends of said small diameter portion: and said cylindrical cover is plastically deformed at one end portion thereof to be bent and engaged into said annular groove, including the steps of:

providing a roll rotatable freely;

bringing said roll to face the external surface of said cylindrical cover in alignment with said annular groove; and pressing said roll onto the external surface of said cylindrical cover while revolving said roll around said rotary shaft so that said one end of said cylindrical cover is plastically deformed to be bent and engaged into said annular groove over the whole circumferential length of said annular groove.

5. A motor having said rotor as defined in claim 1, wherein said rotor is mounted in a housing to be rotatable within a stator secured to an internal surface of said housing.

6. A rotor having a plurality of permanent magnets secured circumferentially on the external surface of a rotary shaft, said rotor includes a cylindrical cover made of a non-magnetic material covering the external surfaces of said plurality of permanent magnets, wherein said cylindrical cover is fixed to said rotary shaft with at least one of axial end portions thereof being plastically deformed, wherein said plurality of permanent magnets are secured at an annular small diameter portion formed on said rotary shaft.

7. A rotor having a plurality of permanent magnets secured circumferentially on the external surface of a rotary shaft, said rotor includes a cylindrical cover made of a non-magnetic material covering the external surfaces of said plurality of permanent magnets, wherein said cylindrical cover is fixed to said rotary shaft with at least one of axial end portions thereof being plastically deformed, wherein large diameter portions whose diameter is slightly larger than the diameter defined by the external surfaces of said plurality of permanent magnets held on said rotary shaft are formed respectively in the vicinity of the axial ends of said annular small diameter portion; and said cylindrical cover made of said non-magnetic material covering the external surfaces of said plurality of permanent magnets are secured to said rotary shaft with both axial end portions thereof being fit respectively on said large diameter portions.

* * * * *